US011598641B2

(12) United States Patent
Jin et al.

(10) Patent No.: US 11,598,641 B2
(45) Date of Patent: Mar. 7, 2023

(54) CHARGING FACILITY GUIDANCE SYSTEM AND CHARGING FACILITY GUIDANCE DEVICE

(71) Applicant: TOYOTA JIDOSHA KABUSHIKI KAISHA, Toyota (JP)

(72) Inventors: Xin Jin, Nagoya (JP); Taiki Nakamura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 253 days.

(21) Appl. No.: 17/004,607

(22) Filed: Aug. 27, 2020

(65) Prior Publication Data
US 2021/0156703 A1 May 27, 2021

(30) Foreign Application Priority Data
Nov. 25, 2019 (JP) .............................. JP2019-212673

(51) Int. Cl.
*G01C 21/34* (2006.01)
*G01C 21/36* (2006.01)
(Continued)

(52) U.S. Cl.
CPC ..... *G01C 21/3469* (2013.01); *G01C 21/3679* (2013.01); *G01C 21/3697* (2013.01); *G07C 5/008* (2013.01); *G07C 5/0808* (2013.01)

(58) Field of Classification Search
None
See application file for complete search history.

(56) References Cited

U.S. PATENT DOCUMENTS

| 2010/0106401 A1* | 4/2010 | Naito | B60L 53/00 |
| | | | 701/533 |
| 2011/0224900 A1* | 9/2011 | Hiruta | G01C 21/3469 |
| | | | 701/533 |

(Continued)

FOREIGN PATENT DOCUMENTS

| JP | 2006112932 A | * | 4/2006 | .......... B60L 11/1838 |
| JP | 2011-174711 A | | 9/2011 | |

(Continued)

OTHER PUBLICATIONS

Machine translation of KR-20120089399-A (Year: 2012).*
Machine translation of JP-2006112932-A (Year: 2006).*
Machine translation of JP-2018128332-A (Year: 2018).*

*Primary Examiner* — Anne Marie Antonucci
*Assistant Examiner* — Kyle S Park
(74) *Attorney, Agent, or Firm* — Sughrue Mion, PLLC

(57) ABSTRACT

A charging facility guidance system is equipped with an electric vehicle and a server device. The electric vehicle is equipped with a first processor transmitting information on a current position and a remaining battery level of the electric vehicle to the server device. The server device is equipped with a second processor calculating a possible cruising distance of the electric vehicle based on the remaining battery level thereof, setting a charging facility search range indicating a range of search for charging facilities for the electric vehicle along a route from a place of departure of the electric vehicle to a destination of the electric vehicle, searching for charging facilities included in the charging facility search range, based on the possible cruising distance, selecting the charging facility located as close as possible to the destination, and transmitting information on the selected charging facility to the electric vehicle.

16 Claims, 8 Drawing Sheets

(51) Int. Cl.
   *G07C 5/08*    (2006.01)
   *G07C 5/00*    (2006.01)

(56)          References Cited

U.S. PATENT DOCUMENTS

2011/0238287 A1 *  9/2011  Hayashi ............ G01C 21/3682
                                                    701/532
2015/0354974 A1 * 12/2015  Takehara ................ B60L 53/66
                                                    701/423

FOREIGN PATENT DOCUMENTS

JP       2013-142679 A       7/2013
JP        2018128332 A  *    8/2018
JP       2019-184460 A      10/2019
KR        20120089399 A  *   8/2012

* cited by examiner

CHARGING FACILITY GUIDANCE SYSTEM AND CHARGING FACILITY GUIDANCE DEVICE

INCORPORATION BY REFERENCE

The disclosure of Japanese Patent Application No. 2019-212673 filed on Nov. 25, 2019 including the specification, drawings and abstract is incorporated herein by reference in its entirety.

BACKGROUND

1. Technical Field

The present disclosure relates to a charging facility guidance system and a charging facility guidance device.

2. Description of Related Art

In Japanese Patent Application Publication No. 2011-174711 (JP 2011-174711 A), there is disclosed an in-vehicle navigation device that searches for a plurality of charging facilities located within a travelable range on a set route and that displays charging facility information, peripheral facility information, and charging time in association with each of the charging facilities.

SUMMARY

There have been demands for an art of providing guidance on charging facilities with high charging efficiency for electric vehicles instead of simply providing guidance on charging facilities on a route.

The present disclosure has been made in consideration of the foregoing, and aims at providing a charging facility guidance system and a charging facility guidance device that can provide guidance on charging facilities with high charging efficiency.

A charging facility guidance system according to the present disclosure is equipped with an electric vehicle and a server device. The electric vehicle is equipped with a first processor that has a piece of hardware and that transmits information on a current position and a remaining battery level of the electric vehicle to the server device. The server device is equipped with a second processor that has a piece of hardware, that calculates a possible cruising distance of the electric vehicle based on the remaining battery level of the electric vehicle, that sets a charging facility search range indicating a range of search for charging facilities for the electric vehicle along a route from a place of departure of the electric vehicle to a destination of the electric vehicle, based on the possible cruising distance, that searches for charging facilities included in the charging facility search range, that selects the charging facility located as close as possible to the destination, and that transmits information on the selected charging facility to the electric vehicle.

A charging facility guidance device according to the present disclosure is equipped with a processor having a piece of hardware. The processor receives information on a current position and a remaining battery level of an electric vehicle from the electric vehicle, calculates a possible cruising distance of the electric vehicle based on the remaining battery level of the electric vehicle, sets a charging facility search range indicating a range of search for charging facilities for the electric vehicle along a route from a place of departure of the electric vehicle to a destination of the electric vehicle, based on the possible cruising distance, searches for charging facilities included in the charging facility search range, selects the charging facility located as close as possible to the destination, and transmits information on the selected charging facility to the electric vehicle.

The present disclosure can provide guidance on charging facilities located as close as possible to a destination and exhibiting high charging efficiency.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
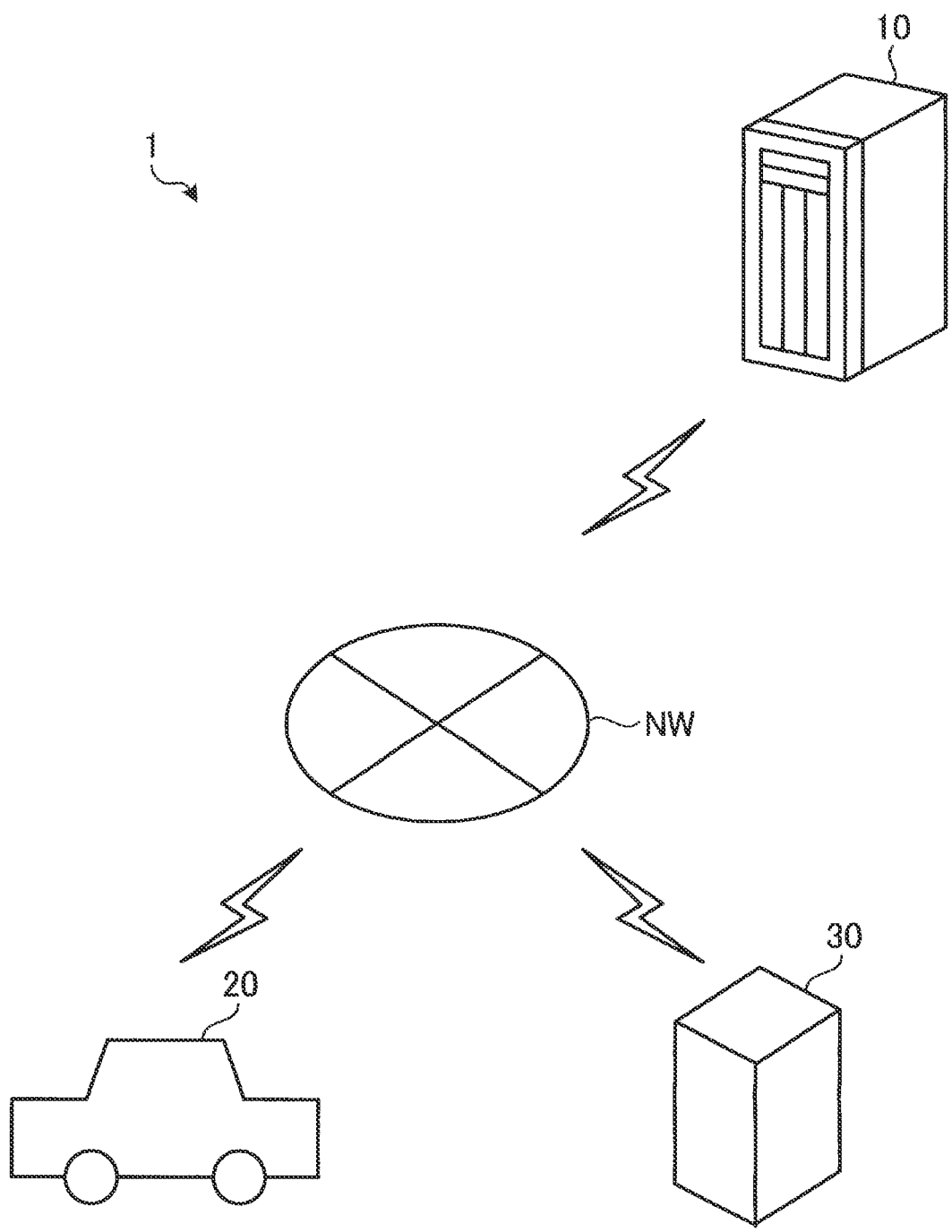
FIG. 1 is a view schematically showing a charging facility guidance system and a charging facility guidance device according to one of the embodiments.

A charging facility guidance system and a charging facility guidance device according to one of the embodiments of the present disclosure will be described with reference to the drawings. Incidentally, component elements in the following embodiment include component elements that can be replaced and easily conceived by those skilled in the art, or component elements substantially identical thereto.

It should be noted herein that when the possible cruising distance of an electric vehicle is slightly shorter than a distance from a current position to a destination (e.g., the required electric power obtained by converting the possible cruising distance is short by 5%) in setting a route to a destination, a charging facility located ahead on the route, namely, a charging facility located as close as possible to the current position of the electric vehicle is displayed to propose charging, in an art disclosed in Japanese Patent Application Publication No. 2011-174711 (JP 2011-174711 A). In this case, the electric vehicle stops over at the charging facility soon after starting to travel toward the destination, and is charged for a short period of time (e.g., five minutes).

It is known that the charging efficiency is higher and the electric vehicle can be charged in a shorter period of time in charging the electric vehicle with the charging amount thereof being small (e.g., 20%). Therefore, when the electric vehicle is charged with the charging amount thereof being large on the route ahead as in the art disclosed in Japanese Patent Application Publication No. 2011-174711 (JP 2011-174711 A), the charging efficiency is low. Thus, the charging facility guidance system and the charging facility guidance device according to the present embodiment provide guidance on charging facilities with high efficiency for the electric vehicle, instead of simply providing guidance on charging facilities located on the route. It is known that the charging efficiency is higher and the electric vehicle can be charged in a shorter period of time when the electric vehicle is charged with the charging amount thereof being small (e.g., 20%) than when the electric vehicle is charged with the charging amount thereof being large (e.g., 80%). Therefore, when the electric vehicle is charged with the charging amount thereof being large on the route ahead as in the art disclosed in Japanese Patent Application Publication No. 2011-174711 (JP 2011-174711 A), the charging efficiency is low. Thus, the charging facility guidance system and the charging facility guidance device according to the present embodiment provide guidance on charging facilities with high charging efficiency for the electric vehicle, instead of simply providing guidance on charging facilities located on the route.

Charging Facility Guidance System/Charging Facility Guidance Device

The configurations of the charging facility guidance system and the charging facility guidance device according to the present embodiment will be described with reference to FIGS. 1 and 2. The charging facility guidance system and the charging facility guidance device according to the present embodiment are designed to provide an electric vehicle that travels from a place of departure to a destination along a preset route with guidance on charging facilities at which the electric vehicle should stop over before reaching the destination.

As shown in FIG. 1, a charging facility guidance system 1 has a server device 10, an electric vehicle 20, and a charging facility (charging spot) 30. In concrete terms, the charging facility guidance device according to the present embodiment is realized by the server device 10. Besides, although only the single electric vehicle 20 and only the single charging facility 30 are shown in FIG. 1, there may be a plurality of electric vehicles 20 and a plurality of charging facilities 30.

The server device 10, the electric vehicle 20, and the charging facility 30 are configured to be able to communicate with one another via a network NW The network NW is configured as, for example, an Internet line network or a cellular phone line network.

Server Device

Figure 2:
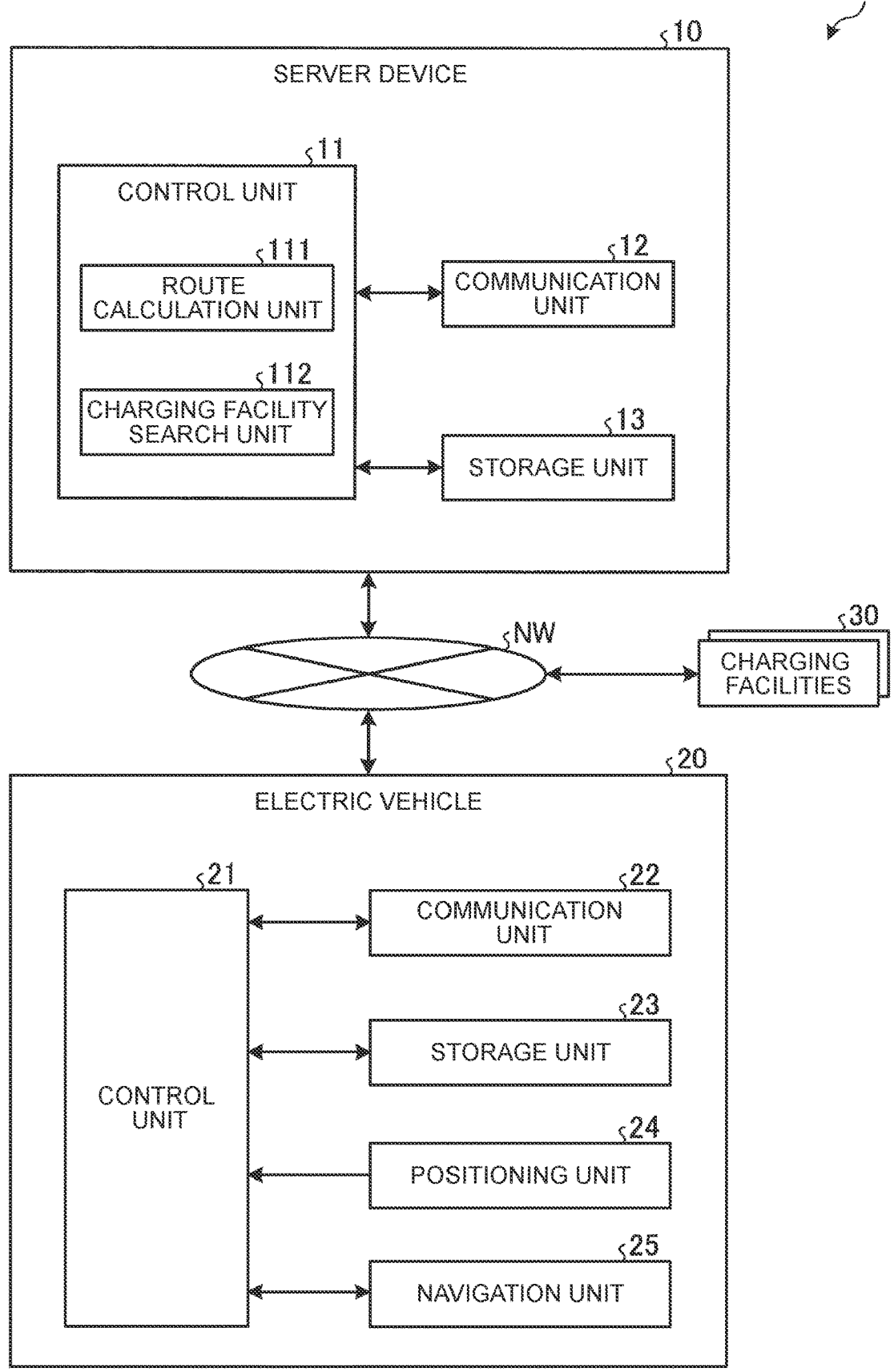
FIG. 2 is a block diagram schematically showing the configurations of the charging facility guidance system and the charging facility guidance device according to the embodiment.
Figure 3:
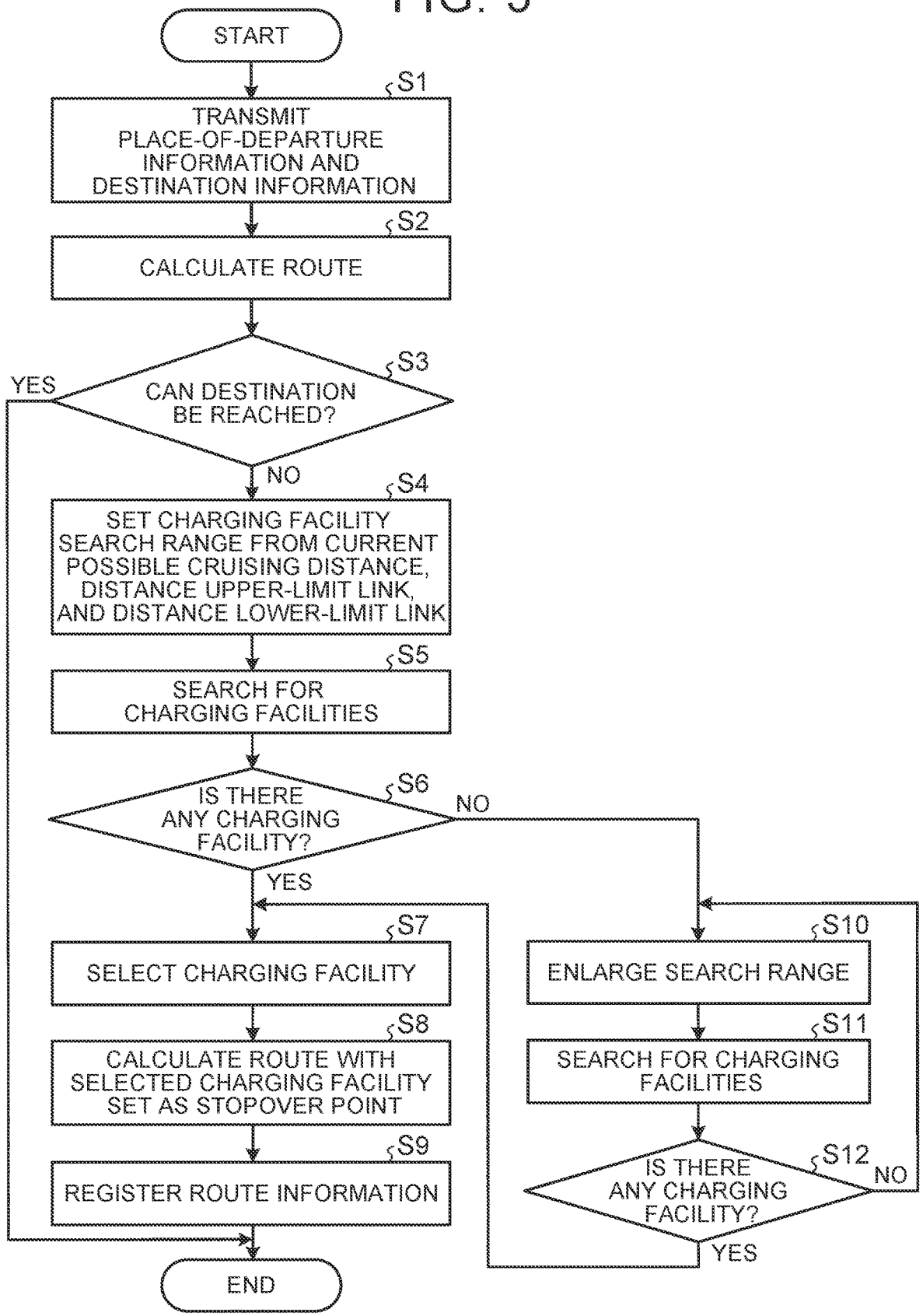
FIG. 3 is a flowchart showing a processing procedure of a charging facility guidance method that is carried out by the charging facility guidance system and the charging facility guidance device according to the embodiment.

As shown in FIG. 2, the server device 10 is equipped with a control unit 11, a communication unit 12, and a storage unit 13. In concrete terms, the control unit 11 is equipped with a processor configured as a central processing unit (CPU), a digital signal processor (DSP), or a field-programmable gate array (FPGA), and a memory (main storage unit) configured as a random access memory (RAM) or a read only memory (ROM).

The control unit 11 realizes a function matching a predetermined purpose, by loading programs stored in the storage unit 13 into a work area of the main storage unit, executing the programs, and controlling respective component units and the like through the execution of the programs. The control unit 11 functions as a route calculation unit 111 and a charging facility search unit 112 through the execution of the programs.

Figure 4:
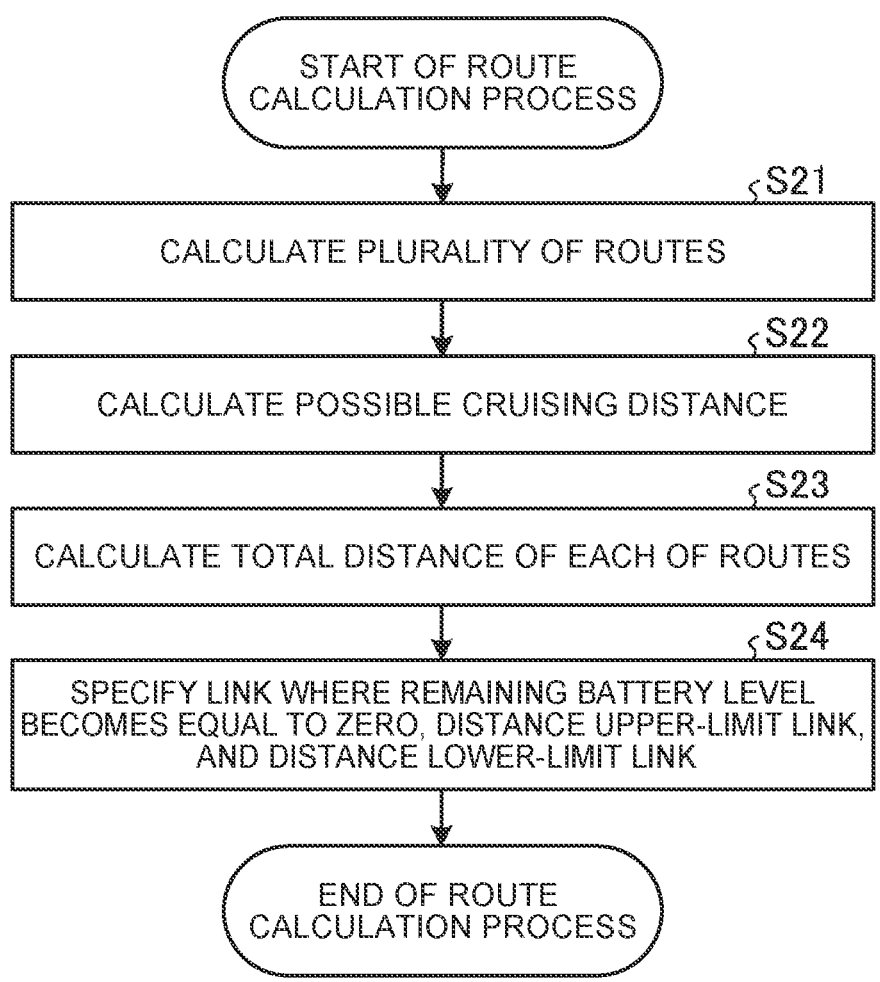
FIG. 4 is a flowchart showing the details of a route calculation process in the charging facility guidance method that is carried out by the charging facility guidance system and the charging facility guidance device according to the embodiment.

The route calculation unit 111 calculates a route (path) along which the electric vehicle 20 travels. The details of a route calculation process that is performed by the route calculation unit 111 will be described later (see FIG. 4).

Figure 6:
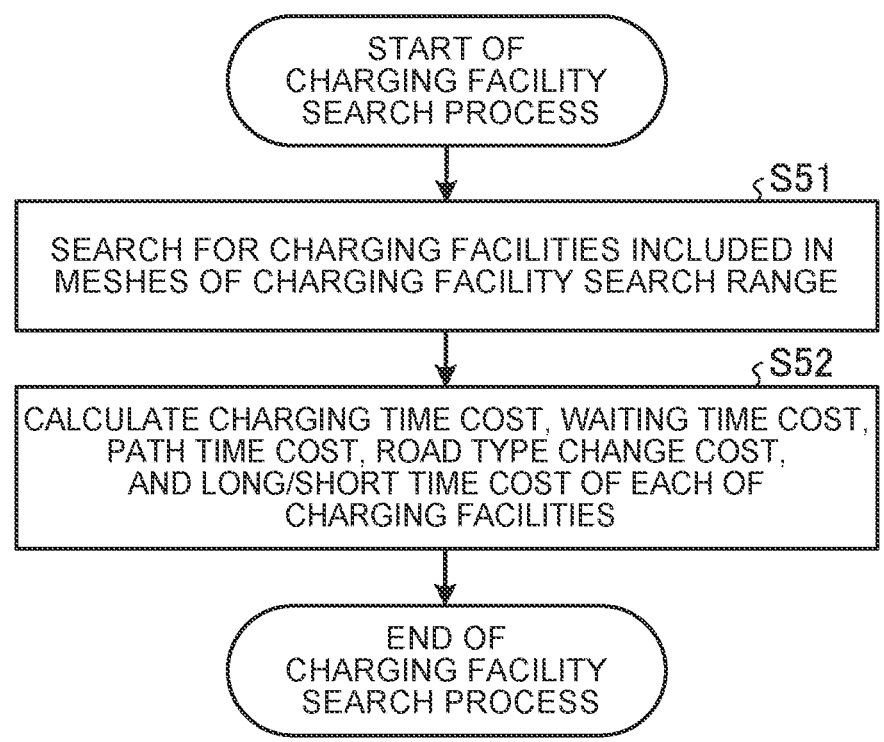
FIG. 6 is a flowchart showing the details of a charging facility search process in the charging facility guidance method that is carried out by the charging facility guidance system and the charging facility guidance device according to the embodiment.
Figure 7:
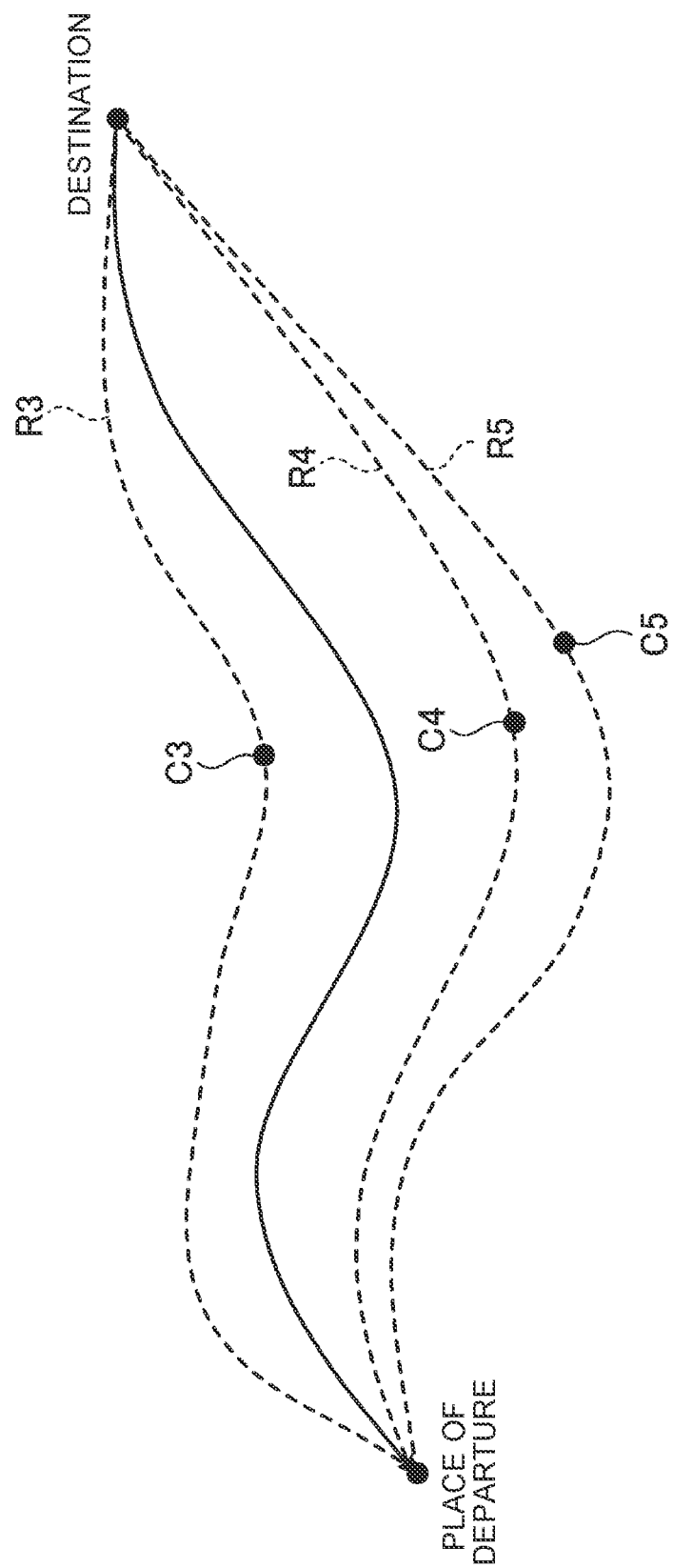
FIG. 7 is a view for illustrating a path time cost in the charging facility guidance method that is carried out by the charging facility guidance system and the charging facility guidance device according to the embodiment.

The charging facility search unit 112 sets a charging facility search range based on a possible cruising distance of the electric vehicle 20, searches for charging facilities included in the charging facility search range, and selects the charging facility located as close as possible to a destination. The details of a charging facility search process that is performed by the charging facility search unit 112 will be described later (see FIG. 6).

The communication unit 12 is configured as, for example, a local area network (LAN), an interface board, or a wireless communication circuit for wireless communication. The communication unit 12 is connected to the network NW such as the Internet as a public communication network. Moreover, the communication unit 12 establishes communication between the electric vehicle 20 and the charging facility 30 by connecting to the network NW.

The storage unit 13 is configured as a storage medium such as an erasable programmable ROM (EPROM), a hard disk drive (HDD), or a removable medium. As the removable medium, it is possible to mention, for example, a universal serial bus (USB) memory, or a disc storage medium such as a compact disc (CD), a digital versatile disc (DVD), or a Blu-ray® disc (BD). Besides, the storage unit 13 can store an operating system (OS), various programs, various tables, various databases, and the like.

The storage unit 13 may temporarily store computation results obtained by the route calculation unit 111 and the charging facility search unit 112, and the like. Besides, the storage unit 13 may store information on a remaining battery level of the electric vehicle 20 that has been acquired through communication between the server device 10 and the electric vehicle 20. Besides, the storage unit 13 may store information on the charging facility 30 (hereinafter referred to as "charging facility information") that has been acquired through communication between the server device 10 and the charging facility 30. As the charging facility information, it is possible to mention, for example, a name of the charging facility, a position (e.g., a latitude and a longitude) of the charging facility, a charging capacity of the charging facility (e.g., fast charging or normal charging), a charging tariff of the charging facility, a quantity of charging devices at the charging facility, and a status of use of the charging devices.

The electric vehicle 20 is, for example, an electric vehicle (EV) or a plug-in hybrid electric vehicle (PHEV). The electric vehicle 20 is equipped with a control unit 21, a communication unit 22, a storage unit 23, a positioning unit 24, and a navigation unit 25. The control unit 21 and the storage unit 23 are physically identical to the control unit 11 and the storage unit 13 respectively.

The control unit 21 is an electronic control unit (ECU) that comprehensively controls the operation of various component elements mounted in the electric vehicle 20. The communication unit 22 is configured as, for example, a data communication module (DCM), and communicates with the server device 10 through wireless communication via the network NW. The storage unit 23 stores, if necessary, information on the position of the vehicle (hereinafter referred to as "vehicle position information") that has been detected by the positioning unit 24.

The positioning unit 24 receives electric waves from a global positioning system (GPS) satellite, and detects the vehicle position information. In response to this detection, the control unit 21 periodically transmits the vehicle position information to the server device 10 through the network NW. Incidentally, the method of detecting the vehicle position information is not limited to the method in which the GPS satellite is utilized. For example, it is possible to utilize a method in which light detection and ranging and laser imaging detection and ranging (LiDAR) and a three-dimensional digital map are combined with each other.

The navigation unit 25 receives/outputs data such as map information and traveling route information, a navigation program, and the like from/to the control unit 21. Thus, the control unit 21 causes the electric vehicle 20 to travel by supplying various command signals to the respective component elements constituting the electric vehicle 20. Incidentally, the navigation unit 25 itself may be equipped with a control unit such as a CPU, and a storage medium such as a RAM or a ROM.

In concrete terms, the navigation unit 25 is equipped with input/output means such as a touch panel display and a speaker microphone. These input/output means convey predetermined information to the outside by displaying letters, figures, and the like on a screen of the touch panel display and outputting voice from the speaker microphone, in accordance with the control performed by the control unit 21. Besides, the input/output means input predetermined information to the control unit 21 through the operation of the touch panel display or the utterance of voice toward the speaker microphone by an occupant of the electric vehicle 20.

In the charging facility guidance system 1 and the charging facility guidance device according to the present embodiment, the route to the destination via the charging facilities found through the search by the server device 10 is displayed on, for example, the screen of the touch panel display with which the navigation unit 25 is equipped. That is, in the charging facility guidance system 1 and the charging facility guidance device according to the present embodiment, the occupant of the electric vehicle 20 is presented with information on the charging facilities through the touch panel display of the navigation unit 25.

Incidentally, the electric vehicle 20 is equipped with an inverter, a motor, a battery, and the like as well as the components shown in FIG. 2. The control unit 21 of the electric vehicle 20 can detect information on a remaining level of a battery (a state of charge (SOC) that will be referred to hereinafter as "a remaining battery level"), and transmits the information on the remaining battery level to the server device 10, if necessary. Charging Facility Guidance Method A charging facility guidance method that is carried by the charging facility guidance system 1 according to the present embodiment will be described with reference to FIGS. 3 to 8.

First of all, the control unit 21 of the electric vehicle 20 transmits place-of-departure information and destination information to the server device 10 (step S1). "The place-of-departure information" is information on a current position of the electric vehicle 20 detected by, for example, the positioning unit 24. Besides, "the destination information" is information on a destination input by the occupant of the electric vehicle 20 through the touch panel display of the navigation unit 25.

Subsequently, the route calculation unit 111 of the server device 10 calculates a route along which the electric vehicle 20 travels (step S2). The details of the route calculation process in step S2 will be described with reference to FIG. 4.

The route calculation unit 111 first calculates a plurality of routes (e.g., three routes) based on the place-of-departure information and the destination information (step S21). Subsequently, the route calculation unit 111 calculates a possible cruising distance of the electric vehicle 20, based on information on the remaining battery level received from the electric vehicle 20 (step S22). Subsequently, the route calculation unit 111 calculates a total distance of each of the routes calculated in step S21 (step S23). Subsequently, the route calculation unit 111 specifies a link where the remaining battery level becomes equal to zero, a distance upper-limit link, and a distance lower-limit link in each of the routes calculated in step S21, based on the possible cruising distance of the electric vehicle 20 calculated in step S22 (step S24), and stores the specified respective pieces of information into the storage unit 13.

Figure 5:
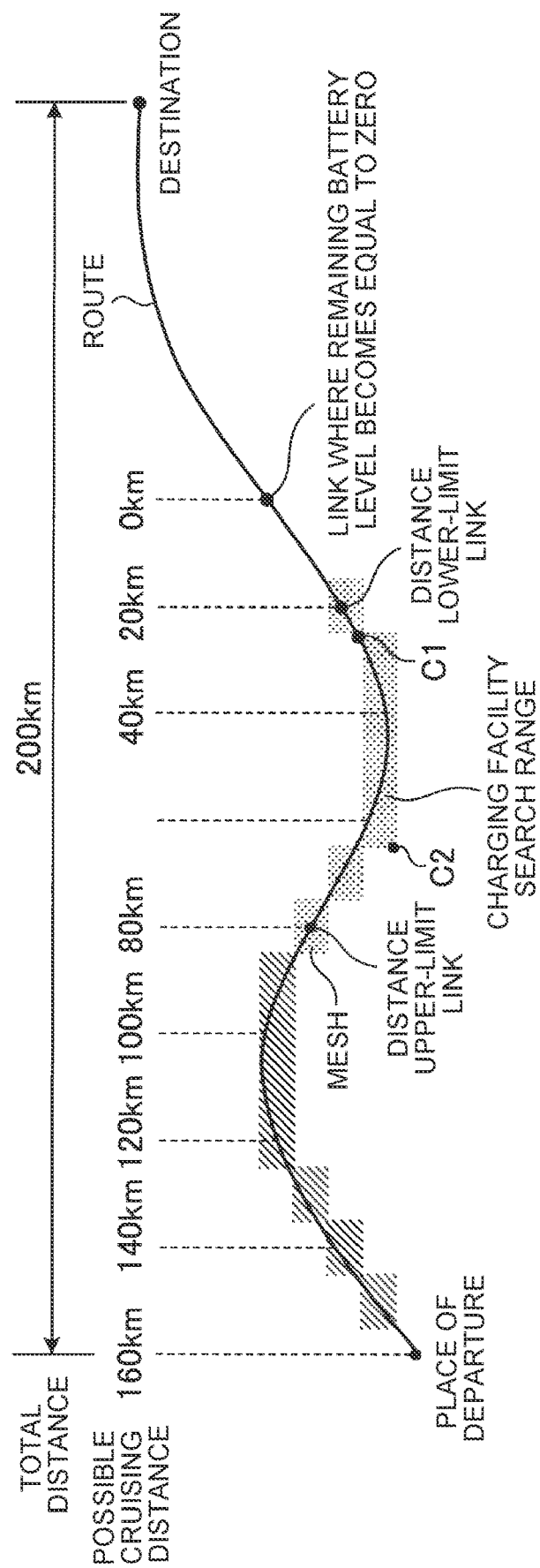
FIG. 5 is a view for illustrating a method of setting a charging facility search range in the charging facility guidance method that is carried out by the charging facility guidance system and the charging facility guidance device according to the embodiment.

"The link where the remaining battery level becomes equal to zero" is a link where the remaining battery level of the electric vehicle 20 is expected to become equal to 0, among links constituting each of the routes along which the electric vehicle 20 travels. For example, in the case where the total distance of each of the routes is 200 km and the possible cruising distance of the electric vehicle 20 is 160 km as shown in FIG. 5, "the link where the remaining battery level becomes equal to zero" is a link along the route located at a distance of 160 km from the place of departure.

Besides, "the distance upper-limit link" is a link along the route located at an upper limit of a distance for searching for charging facilities. Besides, "the distance lower-limit link" is a link along the route located closer to the destination than the distance upper-limit link and at a lower limit of the distance for searching for charging facilities. For instance, in the example shown in FIG. 5, "the distance upper-limit link" is a link along the route located at a position of possible cruising distance of 80 km, and "the distance lower-limit link" is a link along the route located at a position of possible cruising distance of 20 km. The distance upper-limit link and the distance lower-limit link are set based on a predetermined rule, referring to, for example, the possible cruising distance of the electric vehicle 20. The description will be continued with reference again to FIG. 3. Incidentally, the processes of steps S3 to S7 that will be described hereinafter are performed for each of the routes calculated in step S21.

In step S3, the control unit 11 of the server device 10 determines whether or not the electric vehicle 20 can reach the destination (step S3). When the possible cruising distance calculated in step S22 is equal to or longer than the total distance of each of the routes calculated in step S23, the control unit 11 determines that the electric vehicle 20 can reach the destination (Yes in step S3), and ends the present process. On the other hand, when the possible cruising distance calculated in step S22 is shorter than the total distance of each of the routes calculated in step S23, the control unit 11 determines that the electric vehicle 20 cannot reach the destination (No in step S3), and proceeds to step S4.

In step S4, the control unit 11 sets a charging facility search range along the route, based on the current possible cruising distance of the electric vehicle 20, the distance upper-limit link, and the distance lower-limit link (step S4). "The charging facility search range" is a range of search for charging facilities for the electric vehicle 20, and is constituted of, for example, regions hatched by dots in FIG. 5. The charging facility search range can be presented as predetermined regions (hereinafter referred to as "meshes") including links along the route on the map, as shown in FIG. 5.

Subsequently, the charging facility search unit 112 of the server device 10 searches for charging facilities via which the electric vehicle 20 should travel, in the charging facility search range set in step S4 (step S5). The details of the charging facility search process in step S5 will be described with reference to FIG. 6.

The charging facility search unit 112 searches for charging facilities included inside the meshes of the charging facility search range set along the route between the distance upper-limit link and the distance lower-limit link (step S51). The inside of the meshes of the charging facility search range is the inside of the regions hatched by dots in, for example, FIG. 5. In the example of FIG. 5, two charging facilities C1 and C2 are included inside the meshes of the charging facility search range.

Subsequently, the charging facility search unit 112 calculates a charging time cost (a first cost), a waiting time cost (a second cost), a path time cost (a third cost), a road type change cost (a fourth cost), and a long/short time cost (a fifth cost) for each of the charging facilities found through the search in step S51 (step S52).

"The charging time cost" is a cost indicating a time in charging the electric vehicle 20 at each of the charging facilities, and is expressed in the unit of, for example, "minute". The charging time cost can be calculated according to, for example, an equation (1) shown below. However, a fixed value (e.g., "30 minutes") may be used as the charging time cost.

[Equation 1]

$$\text{Charging Time Cost} = \text{Battery Full Charging Capacity} \times (\text{Charging Rate} - \text{SOC}) \div (\text{Charging Ability} \times \text{Charging Efficiency}) \quad (1)$$

"The waiting time cost" is a cost indicating a waiting time at each of the charging facilities, and is expressed in the unit of, for example, "minute". The waiting time cost is calculated only when charging facility information (the status of use of charging devices) can be acquired from each of the charging facilities.

"The path time cost" is a cost indicating a time in traveling to the destination via the respective charging facilities, and is expressed in the unit of, for example, "minute". The path time cost is a value that differs depending on the calculated route. When three charging facilities C3 to C5 are found in step S51 as shown in, for example, FIG. 7, the charging facility search unit 112 calculates path time costs of routes R3 to R5 including the charging facilities C3 to C5 respectively.

"The road type change cost" is a cost indicating a change in road type in traveling to the destination via the respective charging facilities, and is expressed in the unit of, for example, "minute". "The change in road type" indicates, for example, a case of entering an expressway from a general road or a case of entering a general road from an expressway. The road type change cost may be set as the same value, for example, "30 minutes" regardless of whether the electric vehicle 20 enters an expressway from a general road or enters a general road from an expressway, or may be set as a value that differs depending on whether the electric vehicle 20 enters an expressway from a general road or enters a general road from an expressway.

"The long/short time cost" is a cost that is set in accordance with a distance from each of the charging facilities to the distance lower-limit link, and is expressed in the unit of, for example, "minute". The long/short time cost is a cost for searching for a charging facility located as close as possible to the distance lower-limit link, with a view to minimizing the number of times of charging. The long/short time cost is set as, for example, a value that decreases as the distance from the charging facility to the distance lower-limit link shortens.

The long/short time cost can be calculated by multiplying an additional charging probability coefficient by a sum of the charging time cost and the waiting time cost. Besides, the additional charging probability coefficient can be calculated by dividing the distance from each of the charging facilities to the destination by the possible cruising distance of the electric vehicle 20 after charging the electric vehicle 20 at each of the charging facilities. In concrete terms, the long/short time cost can be calculated according to equations (2) to (4) shown below.

[Equation 2]

$$\text{Long/Short Time Cost} = \text{Additional Charging Probability Coefficient } KN \times (\text{Charging Time Cost} + \text{Waiting Time Cost}) \quad (2)$$

[Equation 3]

$$\text{Additional Charging Probability Coefficient } KN = \text{Integer Value of Additional Charging Coefficient } Kn \quad (3)$$

[Equation 4]

$$\text{Additional Charging Coefficient } Kn = DCn \div LCn \quad (4)$$

DCn: Distance from Charging Facility to Destination
LCn: Possible Cruising Distance after Charging The additional charging coefficient Kn in the equation (4) indicates the possibility of additional charging becoming necessary after charging the electric vehicle 20 at the charging facility. When "Kn<1", there is no possibility of additional charging. When "Kn≥1", there is a possibility of additional charging (the number of times of charging is 1). When "Kn≥2", there is a possibility of additional charging (the number of times of charging is 2). Besides, the possible cruising distance LCn after charging can be calculated as, for example, "the distance from the place of departure to the charging facility×0.8". The description will be continued with reference again to FIG. 3.

In step S6, the charging facility search unit 112 determines whether or not there is at least one charging facility in the charging facility search range (step S6). If it is determined that there is at least one charging facility in the charging facility search range (Yes in step S6), the charging facility search unit 112 selects at least one charging facility at which the electric vehicle 20 should be charged, from among charging facilities found through the search (step S7). In step S7, the charging facility search unit 112 selects the charging facility located as close as possible to the destination. That is, the charging facility search unit 112 selects the charging facility with a lowest sum of the charging time cost, the waiting time cost, the path time cost, the road type change cost, and the long/short time cost, from among the charging facilities.

Besides, when the sums of the respective costs calculated as to the charging facilities are equal to one another, the charging facility search unit 112 selects the charging facility with the lowest waiting time cost. Thus, the charging facility with a short waiting time of charging can be selected, so the required time to the destination can be reduced.

Subsequently, the route calculation unit 111 calculates a route again with the selected charging facility set as a stopover point (step S8). The method of the route calculation process in step S8 is identical to steps S21 to S24. Subsequently, the control unit 11 registers route information including information on the selected charging facility into the navigation unit 25 of the electric vehicle 20 (step S9), and ends the present process. In step S9, the control unit 11 transmits the route information including the information on the selected charging facility to the electric vehicle 20. In response to this transmission, the navigation unit 25 displays the route information on the screen of the touch panel display of the navigation unit 25, and presents the occupant of the electric vehicle 20 with the route information.

It should be noted herein that if it is determined in step S6 that there is no charging facility in the charging facility search range (No in step S6), the charging facility search unit 112 enlarges the charging facility search range (step S10).

In step S10, the charging facility search unit 112 enlarges the charging facility search range to a range located along the route and closer to the place of departure than the distance upper-limit link. In step S4, the charging facility search range is set in the regions hatched by dots in FIG. 5, namely, between the distance upper-limit link and the distance lower-limit link. In step S10, however, the charging facility search range is enlarged to regions hatched by diagonal lines in FIG. 5, namely, to regions on the place-of-departure side. By enlarging the charging facility search range in this manner, it becomes easy to discover charging facilities.

Subsequently, the charging facility search unit 112 searches for charging facilities via which the electric vehicle 20 should travel, in the charging facility search range enlarged in step S10 (step S11). The details of the charging facility search process in step S5 will be described with reference to FIG. 6. The method of the charging facility search process in step S11 is identical to steps S51 and S52.

Subsequently, the charging facility search unit 112 determines whether or not there is at least one charging facility in the charging facility search range (step S12). If it is determined that there is at least one charging facility in the charging facility search range (Yes in step S12), the charging facility search unit 112 proceeds to step S7. On the other hand, if it is determined that there is no charging facility in the charging facility search range (No in step S12), the charging facility search unit 112 proceeds to step S10.

It should be noted herein that if there is no charging facility in the charging facility search range enlarged to the range located closer to the place of departure than the distance upper-limit link in step S10, the charging facility search unit 112 enlarges the charging facility search range to an adjacent range along the route. That is, the charging facility search unit 112 enlarges the charging facility search range set in step S4 in the width direction with respect to the route, as is the case with regions hatched by dots in FIG. 8. Then, the charging facility search unit 112 searches for charging facilities via which the electric vehicle 20 should travel, in the charging facility search range hatched by the dots in FIG. 8 (step S11). By further enlarging the charging facility search range in this manner, it becomes easy to discover charging facilities.

Figure 8:
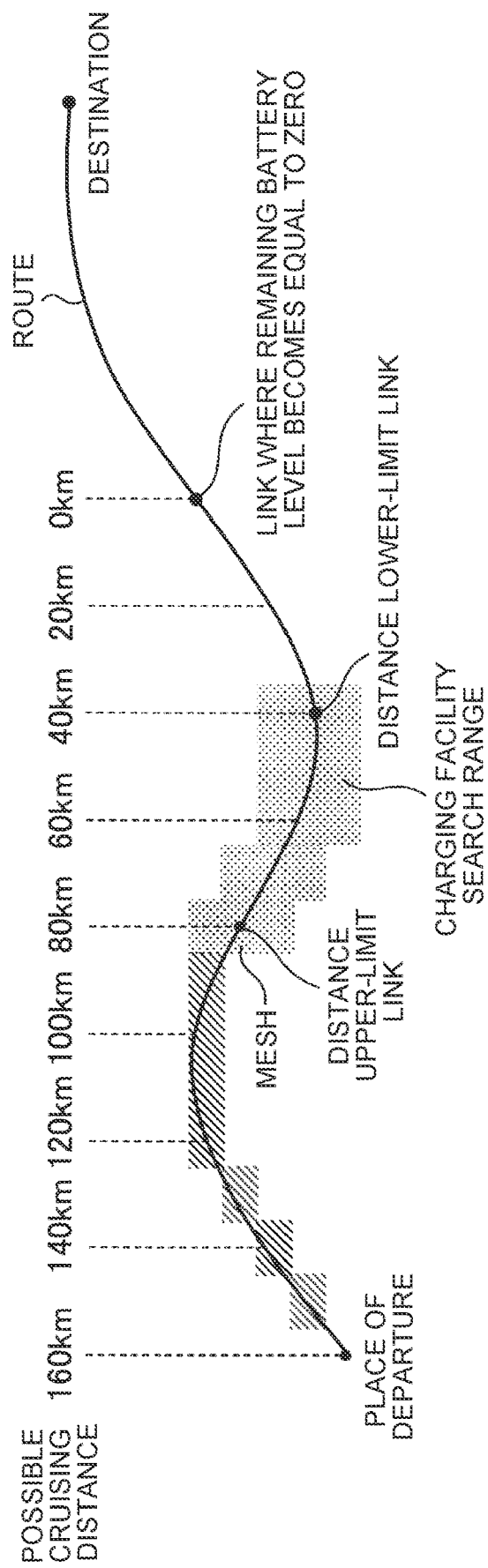
FIG. 8 is a view for illustrating a method of enlarging the charging facility search range when there is no charging facility, in the charging facility guidance method that is carried out by the charging facility guidance system and the charging facility guidance device according to the embodiment.

Besides, when the charging facility search range is enlarged to the adjacent range along the route, the charging facility search unit 112 resets the position of the distance lower-limit link from an initially set position (see FIG. 5) to a position located along the route and on the place-of-departure side, as shown in FIG. 8. That is, when the size of the charging facility search range in the width direction is enlarged, the charging facility search unit 112 reduces the size of the charging facility search range in the longitudinal direction (the direction along the route). When the charging facility search range is enlarged in the width direction with respect to the route, charging facilities that cannot be reached by the electric vehicle 20 may be included in the charging facility search range. On the other hand, by reducing the charging facility search range in the longitudinal direction as the charging facility search range is enlarged in the width direction, it becomes possible to prevent charging facilities that cannot be reached by the electric vehicle 20 from being included in the charging facility search range.

The charging facility guidance system 1 described above and the charging facility guidance device described above can provide guidance on the charging facility with high charging efficiency that is located as close as possible to the destination. That is, the charging facility guidance system 1 and the charging facility guidance device can select the charging facility located as close as possible to the destination, from among a plurality of charging facilities, by scoring the charging facilities through the use of the long/short time cost.

Additional effects and modification examples can be easily derived by those skilled in the art. In consequence, the broader aspect of the disclosure is not limited to the specific, detailed, and representative embodiment as expressed and described above. Accordingly, various alterations are possible without departing from the spirit or scope of the comprehensive concept of the disclosure defined by the attached claims and equivalents thereof.

For example, the charging facility guidance system 1 and the charging facility guidance device according to the present embodiment present the occupant of the electric vehicle 20 with the route to the destination via the charging facilities found through the search by the charging facility search unit 112 of the server device 10, through the touch panel display of the navigation unit 25, but may present the occupant of the electric vehicle 20 with the route through another device. The charging facility guidance system 1 and the charging facility guidance device according to the present embodiment may present the occupant of the electric vehicle 20 with the route to the destination via the charging facilities, through a computer terminal possessed by the occupant. As this computer terminal, it is possible to mention, for example, a smartphone, a cellular phone, a tablet terminal, a wearable computer, or a personal computer.

Besides, the charging facility guidance system 1 and the charging facility guidance device according to the present embodiment calculate the five costs in searching for charging facilities, but may calculate "a charging expense cost" in addition to the five costs. The charging expense cost is set based on a charging expense per unit time at each pay charging facility.

What is claimed is:
1. A charging facility guidance system comprising:
an electric vehicle equipped with a first processor; and a server device equipped with a second processor, wherein the first processor has a piece of hardware, and obtains a remaining battery level of the electric vehicle, obtains a current position of the electric vehicle, and transmits information on the current position and the remaining battery level of the electric vehicle to the server device, and the second processor has a piece of hardware, calculates a possible cruising distance of the electric vehicle based on the remaining battery level of the electric vehicle, sets a charging facility search range indicating a range of search for charging facilities for the electric vehicle along a route from a place of departure of the electric vehicle to a destination of the electric vehicle, based on the possible cruising distance, searches for the charging facilities included in the charging facility search range, selects the charging facility located as close as possible to the destination, and transmits information on the selected charging facility to the electric vehicle, wherein the second processor sets the charging facility search range based on the possible cruising distance, a distance upper-limit link indicating a link along the route that is located at an upper limit of a distance for searching for the charging facilities, and a distance lower-limit link indicating a link along the route that is located closer to the destination than the distance upper-limit link and at a lower limit of the distance for searching for the charging facilities, the second processor enlarges the charging facility search range to an adjacent range along the route, when there is no charging facility in the charging facility search range, and the second processor resets a position of the distance lower-limit link to a position located along the route and closer to the place of departure, while the charging facility search range is enlarged to the adjacent range along the route.

2. The charging facility guidance system according to claim 1, wherein the second processor divides a predetermined region including the links into meshes on a map, and searches for at least one charging facility included in the mesh along the route between the distance upper-limit link and the distance lower-limit link.

3. The charging facility guidance system according to claim 1, wherein the second processor calculates a first cost indicating a time in charging the electric vehicle at each of the charging facilities included in the charging facility search range, a second cost indicating a waiting time at each of the charging facilities, a third cost indicating a time in traveling to the destination via each of the charging facilities, a fourth cost indicating a change in road type in traveling to the destination via each of the charging facilities, and a fifth cost set in accordance with a distance from each of the charging facilities to the distance lower-limit link, and selects the charging facility with a lowest sum of the costs.

4. The charging facility guidance system according to claim 3, wherein the second processor selects the charging facility with the lowest second cost, when the sums of the costs calculated as to the charging facilities are equal to one another.

5. The charging facility guidance system according to claim 3, wherein the fifth cost is calculated by multiplying an additional charging probability coefficient by a sum of the first cost and the second cost, and the additional charging probability coefficient is calculated by dividing a distance from each of the charging facilities to the destination by the possible cruising distance of the electric vehicle after charging the electric vehicle at each of the charging facilities.

6. The charging facility guidance system according to claim 1, wherein the second processor enlarges the charging facility search range to a range extending along the route and located closer to the place of departure than the distance upper-limit link, when there is no charging facility in the charging facility search range.

7. The charging facility guidance system according to claim 1, wherein when the second processor enlarges the charging facility search range to the adjacent range along the route, the charging facility search range is enlarged in a width direction with respect to the route.

8. The charging facility guidance system according to claim 7, wherein when the charging facility search is enlarged in the width direction, the charging facility search range is reduced in a longitudinal direction along the route.

9. A charging facility guidance device comprising:

a processor having a piece of hardware, wherein the processor receives information on a current position and a remaining battery level of an electric vehicle from the electric vehicle, calculates a possible cruising distance of the electric vehicle based on the remaining battery level of the electric vehicle, sets a charging facility search range indicating a range of search for charging facilities for the electric vehicle along a route from a place of departure of the electric vehicle to a destination of the electric vehicle, based on the possible cruising distance, searches for the charging facilities included in the charging facility search range, selects the charging facility located as close as possible to the destination, and transmits information on the selected charging facility to the electric vehicle, wherein the processor sets the charging facility search range based on the possible cruising distance, a distance upper-limit link indicating a link along the route that is located at an upper limit of a distance for searching for the charging facilities, and a distance lower-limit link indicating a link along the route that is located closer to the destination than the distance upper-limit link and at a lower limit of the distance for searching for the charging facilities, the processor enlarges the charging facility search range to an adjacent range along the route, when there is no charging facility in the charging facility search range, and the processor resets a position of the distance lower-limit link to a position located along the route and closer to the place of departure, while the charging facility search range is enlarged to the adjacent range along the route.

10. The charging facility guidance device according to claim 9, wherein the processor divides a predetermined region including the links into meshes on a map, and searches for at least one charging facility included in the mesh along the route between the distance upper-limit link and the distance lower-limit link.

11. The charging facility guidance device according to claim 9, wherein
the processor calculates a first cost indicating a time in charging the electric vehicle at each of the charging facilities included in the charging facility search range, a second cost indicating a waiting time at each of the charging facilities, a third cost indicating a time in traveling to the destination via each of the charging facilities, a fourth cost indicating a change in road type in traveling to the destination via each of the charging facilities, and a fifth cost set in accordance with a distance from each of the charging facilities to the distance lower-limit link, and selects the charging facility with a lowest sum of the costs.

12. The charging facility guidance device according to claim 11, wherein
the processor selects the charging facility with the lowest second cost, when the sums of the costs calculated as to the charging facilities are equal to one another.

13. The charging facility guidance device according to claim 11, wherein
the fifth cost is calculated by multiplying an additional charging probability coefficient by a sum of the first cost and the second cost, and
the additional charging probability coefficient is calculated by dividing a distance from each of the charging facilities to the destination by the possible cruising distance of the electric vehicle after charging the electric vehicle at each of the charging facilities.

14. The charging facility guidance device according to claim 9, wherein the processor enlarges the charging facility search range to a range extending along the route and located closer to the place of departure than the distance upper-limit link, when there is no charging facility in the charging facility search range.

15. The charging facility guidance device according to claim 9, wherein when the processor enlarges the charging facility search range to the adjacent range along the route, the charging facility search range is enlarged in a width direction with respect to the route.

16. The charging facility guidance device according to claim 15, wherein when the charging facility search is enlarged in the width direction, the charging facility search range is reduced in a longitudinal direction along the route.

* * * * *